Sept. 10, 1963   W. JUDA   3,103,474
ELECTROWINNING OF METALS FROM ELECTROLYTES
Filed Jan. 19, 1960

Inventor:
Walter Juda
by Aaron Tushin
Attorney

_United States Patent Office_ 3,103,474
Patented Sept. 10, 1963

3,103,474
ELECTROWINNING OF METALS FROM ELECTROLYTES
Walter Juda, Lexington, Mass., assignor to Ionics, Incorporated, Cambridge, Mass., a corporation of Massachusetts
Filed Jan. 19, 1960, Ser. No. 3,418
4 Claims. (Cl. 204—104)

This invention relates to the electrochemical formation of metals and acids in electroplating or electrowinning by means of the conversion of hydrogen, hydrogen-containing or hydrogen ion-producing fuels. More particularly, the invention is concerned with electroplating or electrowinning processes and the cells used therefor, wherein the electrolytic cell is equipped with at least one electrolyte solution and at least one porous electrode which may include a catalyst for the electrochemical reaction effected at the surface thereof.

So-called "fuel cells" are well known in which electrical energy (D.C.) is produced from the chemical energy of oxidant and combustible gases introduced through appropriate porous electrodes. In the typical fuel cell, hydrogen gas, or other combustible gas, is introduced into a cell through a porous electrode made, for example, of a noble metal, or of porous carbon or graphite containing a noble metal catalyst, or the like; and oxygen, or an oxygen-containing gas, is introduced through a porous electrode containing preferably an active metal or metal oxide catalyst; the two electrodes being electrolytically connected through either an aqueous electrolyte solution or a solid electrolyte, e.g., an ion exchange membrane. In these cells, low voltage D.C. energy is produced directly from the reaction of hydrogen and oxygen at conversion efficiencies considerably in excess of the usual conversion of chemical energy-to-heat to mechanical energy-to-electric energy.

Electrochemical oxidations and reductions have also been carried out at porous electrodes in the past; in these oxido-reductions porous graphite was preferably used and the aqueous electrolyte solutions were introduced or removed through the porous electrodes.

The electrolytic oxidation of sulfur dioxide at porous electrodes is also known in conjunction with electroplating of metals. Here, the sulfuric acid content of the electrolyte is continuously increased, resulting in a portion of the electrolyte as waste.

In general, the purpose of electroplating with insoluble or "permanent" anodes is to remove a metal from the electrolyte solution by cathodic deposition and replace the same with hydrogen ion without significant change in anion concentration of said electrolyte. The thus acidified solution is then useful for further dissolution of metal from an impure source of said metal.

Electrolytic cells comprising fuel electrodes which are especially adapted for electrochemical conversions in which it is important to obtain certain products from an electrolyte solution are disclosed in applicant's U.S. patent application Serial No. 842,892, filed on September 28, 1959. In the prior disclosure, ion exchange membranes are included in the electrolytic cell as a necessary element for the chemical conversion of the electrolyte. The D.C. electric energy required for electrolysis and for electrodialysis in such cells is usually an important economic factor.

However, fuel electrodes, especially electrodes utilizing water-immiscible hydrogen ion-producing fluid fuels, have not heretofore been incorporated within electroplating or electrowinning cells.

It is an object of the present invention to provide a process involving the use of fuel anodes to produce acid in electrowinning and electroplating cells. It is a further object of the invention to provide means for electrolyzing solutions, wherein a cell is employed containing one fuel catalytic anode, thereby providing means to eliminate the energy required to discharge gases at the anode and/or to reduce the D.C. energy requirement for the electrochemical conversion. A further object of this invention is the provision of an electroplating cell which is an improvement and overcomes many of the disadvantages of the prior art electroplating or electrowinning cells in their use for chemical conversion of electrolytes.

A further object of this invention is to provide a process for electrowinning metals capable of electrodeposition, which is more economical, efficient and feasible than heretofore known. Further objects will become apparent from the following disclosure.

In general, the process and equipment of this invention utilizes an electroplating or electrowinning cell defining at least one solution compartment and a porous hydrogen and hydrogen ion-producing fuel anode containing an active catalyst for the reaction taking place at the porous interface of said anode between the fuel and the electrolyte. The cell of this invention, in its simplest form, comprises a fuel anode and a metal cathode, the latter being the conventional metal cathode used in the specific electroplating or electrowinning operation. In this cell, the fuel anode replaces the conventional insoluble or "permanent" anode at which, for example, oxygen was evolved.

In order to obtain high current efficiencies of metal plating at the cathode, it is often desirable to maintain a high and constant concentration of the metal in these electrolyte solutions near and in contact with the cathode. It is therefore an important variation of this invention to insert a porous diaphragm between the cathode and the anode and to flow concentrated metal-containing electrolyte into the cathode compartment, through the porous diaphragm, and out of the anode compartment, thereby flushing back the hydrogen ions formed in the anolyte. In other words, the flowing electrolyte prevents excessive quantities of hydrogen ions from entering the cathode area to decrease the metal plating efficiency at said cathode.

In one cell construction, according to this invention, a hydrogen ion-producing fuel anode is employed which anode acts as a catalyst for the reaction that takes place at the surface of said anode and the electrolyte. The electrode accordingly is a conductor which is sufficiently porous to adsorb and allow the fuel, in the presence of a catalyst, to react with the electrolyte at the surface of said electrode to produce H+ ion, directly or indirectly.

Substantial savings in energy consumption of the electrolytic process are secured when a fuel catalytic anode, and especially a gas catalytic anode, is integrated with electroplating or electrowinning cells. In such a cell, the necessity of supplying energy for the discharge of a gaseous product at the anode is eliminated. Furthermore, by choosing a hydrogen ion-producing anode with an appropriate catalyst, the conversion of the fuel to the hydrogen ions is accelerated sufficiently so that the gaseous reaction reduces or even eliminates the need for an extra D.C. power supply. Comparing a conversion cell comprising fuel catalytic anodes with a conventional conversion cell powered by a separate fuel cell, (1) a significant energy saving is obtained in the former due to the elimination of the ohmic loss of the separate fuel cell, and (2) a significant investment saving is obtained by eliminating the separate fuel cell altogether.

The saving in total energy consumption obtained by eliminating the energy required to discharge gaseous products at the electrodes is especially significant where the voltage drop across the electrolyte solution is relatively small, of the order of a few volts. Gaseous discharge potentials, including overvoltages, often account for more than one-half the total potential in electroplating or electrowinning with insoluble (permanent) anodes.

In the conventional electroplating or electrowinning cells with permanent anodes, oxidizable solutes are often oxidized at the anode in place of the usual oxygen evolution. For example, if it is desired to plate iron from a ferrous salt solution in such a cell, part of the iron is oxidized from the ferrous to the ferric state at the conventional permanent anode. Similarly, if an oxidizable acid, for example, an organic acid such as acetic acid or lignin sulfonic acid is used, these organic acids are oxidized. However, in the present invention, by the use of a hydrogen ion-producing or hydrogen-containing fuel anode, such oxidations are minimized and result in a much wider variety of electrolytes suitable for electroplating and electrowinning than heretofore employed.

An important application of this invention is the regeneration of pickle liquor. In general, pickle liquor consists of a mixture of sulfuric acid and ferrous sulfate in aqueous solution. It is proposed to electroplate iron from the pickle liquor at the cathode and to reform sulfuric acid by means of a hydrogen ion-producing electrode used as an anode. In this process, the advantage of avoiding or minimizing oxidation of ferrous ferric ion at the anode is especially important.

In order to obtain high current efficiencies, it is further proposed to use the cell described above with a porous chamber dividing diaphragm, for example, an asbestos or ceramic diaphragm, or the like. An overall flow sheet for the regeneration of pickle liquor involves, for example, first evaporating the spent pickle liquor for the purposes of concentrating the free sulfuric acid and crystallizing therefrom ferrous sulfate. The free concentrated sulfuric acid is directly suitable for reuse. The ferrous sulfate crystals can then be dissolved in water and a ferrous sulfate solution is introduced as catholyte into the cell of this invention, through the porous diaphragm, and out from the anolyte. In this way, the deposit of iron occurs at high current efficiencies. Any suitable hydrogen-containing gas or fuel gas providing hydrogen ions at the anode can be used in this process.

The electrochemical reaction at the anode where hydrogen gas or hydrogen-containing gases are employed often necessitates the use of a catalyst for the reaction. Suitable catalysts include metals of Group VIII of the periodic table, such as rhodium, platinum, palladium, and iridium. Other catalysts may constitute the electrodes themselves or they may be impregnated or deposited on porous structures including porous carbon, graphite, porous nickel, and the like. In this respect, reference is made to the many fuel electrodes described in the literature as part of fuel cells, including, for example, British Patent 794,471 of 1958, U.S. Patent 2,860,175, U.S. Patent 2,384,463 and German Patent 904,200 (1954) and the literature quoted therein, many of which are suitable for use according to the present invention.

It is often found necessary to protect a porous fuel catalytic electrode against the capillary sorption of the electrolyte solution by means of a treatment which renders the fuel electrode repellent to the electrolyte solution without closing the pores. Such treatments are known to include, for example, the coating of the fuel electrode with a thin film of paraffin or rubber or the like, without impeding flow through the electrode.

Fuels suitable for this invention include especially hydrogen gas, carbon monoxide, and hydrogen-containing gases, such as water gas (produced by reacting water with coal), reformed natural gas (produced by reacting water with natural gas or other hydrocarbon), partially oxidized natural gas which gives a mixture which is largely hydrogen and carbon monoxide; also producer gas, and the like.

In addition, gaseous hydrocarbons, such as methane, ethane, coal gas, gasified gasoline, natural gas, etc., can also be used with an appropriate catalyst. In general, the fuels suitable in the electroplating and electrowinning cells of this invention are fuels which will produce at the anode, by electrochemical conversion, hydrogen ions without accumulation of a deleterious anion in solution. In addition, liquid fuels, for example, liquid hydrocarbons (with appropriate catalysts), methanol, ethanol, and the like, may also be used.

Typical for a primary conversion is, of course, hydrogen gas which produces hydrogen ion according to the reaction: $H_2 \rightarrow 2H^+ + 2e$. Carbon monoxide at the anode also results in the same production of hydrogen ion in the acid or neutral media of this invention according to the reaction: $CO + H_2O \rightarrow 2H^+ + CO_2 + 2e$. For the purposes of this invention and in the appended claims, the use of the term "hydrogen ion-producing fuel" is to be understood that such fuels produce hydrogen ion without accumulation of an anion in the electrolyte solution.

The use of fuel-catalytic electrodes is of special value when the electrolytic process is carried out in such a manner that energy requirement consists of relatively low D.C. voltage input with attendant relatively high current density. Clearly, their application is further enhanced when the source of hydrogen ion-producing gas is readily available at low cost.

Many electroplating or electrowinning processes of commercial significance dissipate and waste electric energy at the anode. For example, in the electrowinning of metals from their sulfate solutions, including electrowinning of copper, zinc, cadmium, chromium, iron, manganese, nickel, cobalt, etc., oxygen is usually produced at the anode. The anode voltage, which includes the oxygen discharge voltage as well as the oxygen overvoltage, often represents a large fraction of the total electric energy required in the cell. According to one embodiment of this invention, a fuel catalytic electrode is used as the anode and is supplied with hydrogen ion-producing fuel.

The metal electrolytes subject to plating or winning may be plated from many acid or neutral solutions. For the purpose of this invention, such anions can be classified into (1) those which conventionally would discharge at the anode producing oxygen and, (2) those which conventionally would discharge at the anode producing gases other than oxygen. Typical of the first class are sulfates and nitrates and organic anions, such as carboxylates, for example, acetates or the like, or sulfonates, such as lignin sulfonates, etc. The organic anions are especially noted in that they are subject to destruction by oxidation at a conventional anode, whereas in the present case, such oxidation is minimized or even avoided. Thus, a low cost acid, such as lignin sulfonic acid, can now be used in electrolplating solutions, whereas it could not be used with conventional anodes. The second class of anions includes such anions as halide, especially chlorides. In this case, the preferred fuel is hydrogen or hydrogen-containing gas which is capable of forming a hydrogen halide.

In some cases, in order to obtain high current efficiency in accordance with the present invention, it has often been found desirable and sometimes necessary to employ porous separating diaphragms, such as asbestos, etc., in the cell between the spaced electrodes. Generally, when the hydrogen ion produced at the anode tends to be discharged at the cathode, it is desirable to flow the electrolyte from the cathode compartment through a porous diaphragm into the anode compartment and out from there to oppose the movement of $H^+$ ions from anode to cathode.

In order to better illustrate the invention of the present case, reference is made to the drawings wherein.

The invention may be better understood by reference to the following detailed description taken in connection with the drawings which are diagrammatic illustrations of the chemical conversion cells and their operation in the electroplating and electrowinning of metals within the scope of the present invention.

Figure 1:
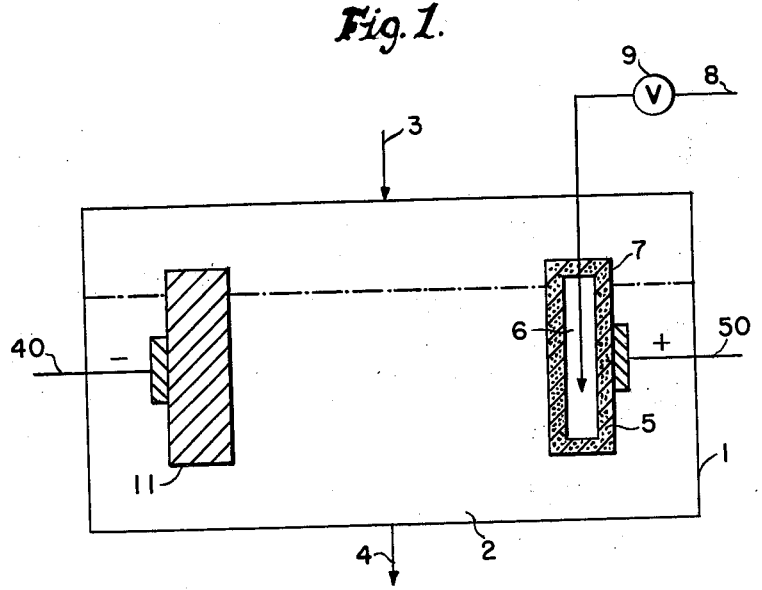
FIG. 1 is a diagrammatic representation of an electrowinning or electroplating cell having a solution compartment, an anodic assembly including the fuel well and porous fuel-catalytic anode, and a conventional cathode.

The cell 1 of FIG. 1 comprises a porous fuel catalytic anode electrode made up of the porous conductor 7 containing a catalyst 5 at its interface in contact with electrolyte 2. The porous anode is provided with means 8 for passing a hydrogen ion-producing fuel into said porous electrode as at well 6. Control of the rate of flow of the fuel into the anode is provided by valve 9. Spaced from the anode is a conventional electroplating or electrowinning cathode 11. A source of D.C. electric current (not shown) contacts the electrodes at 40—50. Means are provided for influent and effluent of the electrolyte solution as at 3 and 4, respectively. The metal produced in this cell may be obtained by periodic removal of the plated electrode 11 and replacement of an unplated substitute cathode therefor.

The operation of the cell of FIG. 1 may be illustrated as follows:

In the electrowinning of copper from copper salt solutions, such as copper sulfate, the conventional cathode electrode is made of copper. Copper sulfate solution 2 is introduced into the cell 1 as at 3. A hydrogen-containing gas is introduced into the porous catalytic anode 7 as at 6 from inlet pipe 8. With the assistance of a D.C. current passing through the cell, copper metal will plate out at the cathode 11, the hydrogen gas reacts at the surface and pores of the anode 7, which reaction is activated by a suitable catalyst to form H ions, which in turn forms sulfuric acid with the sulfate ions of the electrolyte, the latter passing out of the cell as shown at 4. The reaction of $H_2$ gas to $H^+$ ions at the anode interface with the electrolyte in contact therewith produces a potential which minimizes the necessary potential required from the outside source (40—50). Copper metal is periodically recovered from conventional cathode 11.

Figure 2:
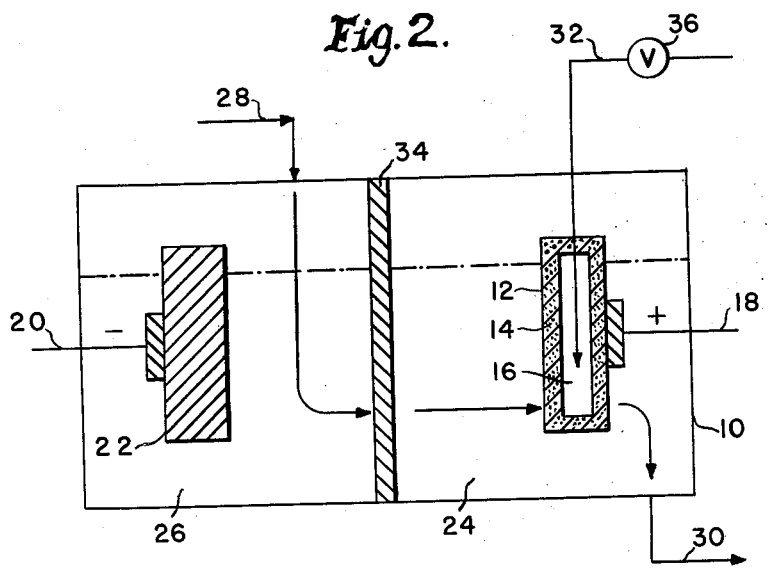
FIG. 2 is a diagrammatic representation of an electrowinning or electroplating cell having two compartments defined by a porous diaphragm and having the above anode assembly in the anode chamber, and a conventional electrode in the cathode chamber and means for passing the electrolyte into the cathode chamber, then through the porous diaphragm and out of the anode chamber.

The cell 10 of FIG. 2 comprises anode and cathode compartments 24 and 26, respectively, defined by a porous diaphragm 34 such as asbestos. The porous fuel anode assembly 12 is the same as that of FIG. 1, wherein the inlet pipe 32, having valve 36 therein, provides anode 12 with the fuel as at 16, contacting the anolyte and reacting therewith by virtue of the presence of the catalyst 14. The cathode 22 is of a conventional type. Cathode chamber 26 is provided with inlet means 28 for passing an electrolyte into said chamber, and the anode chamber is provided with outlet means 30 for the reacted electrolyte which passes through the asbestos diaphragm 34 into said anode chamber. A D.C. potential for the cell is provided through means 18—20 from an outside source (not shown).

The operation of the cell of FIG. 2 may be illustrated, for example, in the electrowinning of iron in the regeneration of pickle liquor for use in the steel industry. Spent pickle liquor, which contains a mixture of ferrous sulfate and sulfuric acid, is introduced into cathode chamber 26 as at 28 at sufficient pressure to flow said liquor through the porous diaphragm 34 into and out of anode chamber 24 as at 30. Upon the impression of sufficient external voltage to augment the voltage created by a hydrogen-containing gas passed into the fuel-catalytic porous anode 12 where hydrogen ions are formed at the anode, iron is plated out at cathode 22. The porous diaphragm 34 functions to separate the anolyte from the catholyte and the flow of the spent pickle liquor through said diaphragm in the direction of the anode flushes and sweeps back into the anode chamber any hydrogen ions that tend to migrate towards the cathode 22. It will be apparent that the reaction of hydrogen gas to hydrogen ions at the anode interface with the pickle liquor minimizes the potential required from an outside source; thus effecting great savings in the cost of producing regenerated pickle liquor from the spent liquor for reuse in the treatment of steel.

To demonstrate the energy advantage to be gained from the use of fuel electrodes in common electroplating operations which are carried out, for example, in sulfuric acid media, a simple electrolytic cell was constructed in accordance with FIG. 1 in which sulfuric acid of specific gravity of 1.225 was used as the electrolyte with a conventional graphite cathode. In the first series of tests indicated as "conventional electrolysis" in the following table, a conventional graphite anode was used. In a second series of tests, the conventional graphite anode was replaced with a hydrogen porous catalytic (platinum) fuel anode. The tests were run at two different temperatures and different current densities covering the usual range in such an operation. The following results were obtained:

TABLE

*Hydrogen Anode in Acid*

| Temp., °C. | Current Density, ma./cm.² | Electrolyte | Conventional Electrolysis, Volts | Hydrogen Anode, Volts |
|---|---|---|---|---|
| 30 | 10 | $H_2SO_4$ 1.225 sp. g | 2.2 | 0.8 |
| 30 | 100 | $H_2SO_4$ 1.225 sp. g | 2.9 | 1.4 |
| 60 | 10 | $H_2SO_4$ 1.225 sp. g | 1.8 | 0.5 |
| 60 | 100 | $H_2SO_4$ 1.225 sp. g | 2.6 | 1.1 |

It is readily seen that the use of the hydrogen ion-producing porous catalytic anode is very effective and economical in acid and neutral media for electroplating of metals.

The following examples are illustrative of the practice of the invention and are not for the purpose of limitation:

EXAMPLE 1

An electrolytic cell of the design of FIG. 1 is constructed containing a porous hydrogen-catalytic (platinum) anode, a copper cathode, an electrolyte solution consisting of leach liquor from low grade copper ores with about 36 grams per liter of copper and 40 grams per liter of sulfuric acid. A current density of 10 milliamps. per square cm. is maintained at the cathode by impressing a voltage of about 1.0 volt across the cell. Ninety percent pure hydrogen is passed into the anode at an adequate rate. Copper is deposited at the cathode. When the hydrogen gas flow into the anode is stopped, the potential across the cell had to be increased to about 2.2 volts to maintain the current density, thus illustrating the savings in power gained through use of this invention.

A cupric chloride solution was substituted for the sulfate solution and similar results were obtained.

The advantages gained in power saving in the electrowinning of copper also apply to a corresponding degree in the electrowinning of Ni, Cr, Cd, Pb, Zn, Ag, Sn, Mn, Co and Fe, as will be apparent from the following further examples directed to iron, zinc, nickel, chromium, cobalt, and cadmium.

EXAMPLE 2

An electrolytic cell of the design of FIG. 1 is constructed containing a hydrogen anode with palladium as the catalyst and an aluminum bronze cathode for the electrowinning of chromium. The electrolyte is prepared from ammonium chrome alum from the sulfuric acid leach of low grade chromium ores and contains approximately 90 grams per liter chromium and 30 grams per liter ammonia. Hydrogen gas is passed into the anode and a current density of 70 milliamps. per square cm. is maintained at the cathode with a cell potential of 2.8 volts at an operating temperature of 50° C. When an inert conventional anode electrode, such as lead, was used in place of the fuel cation membrane anode, the cell potential had to be increased to 4.3 volts, thus illustrating the savings in power.

EXAMPLE 3

A cell of the design of FIG. 1 is constructed with a hydrogen fuel anode and a stainless steel cathode for the electrowinning of cobalt. The electrolyte consists of a solution of 20 grams per liter cobalt as cobalt sulfate, 50 grams per liter boric acid, and 5 grams per liter sodium fluoride. The cell is maintained at 60° C. Hydrogen is passed into the anode and a current density of 25 milliamps. per square cm. is applied to the cathode at 1.3 volts. Greater than 99 percent pure cobalt is deposited at the cathode. Where the cell was operating with an inert or conventional anode, such as lead, increased power was required as shown by the operating cell voltage of 3.0 volts.

EXAMPLE 4

In order to demonstrate the electrowinning of cadmium, a cell is constructed of the design of the pervious example with an aluminum cathode. When hydrogen is passed into the anode and the cell is operated at a current density of 10 milliamps. per square cm. at 1.0 volt, cadmium is deposited as the cathode from an electrolyte containing 180 grams per liter cadmium and 75 grams per liter sulfuric acid. On operating the cell with an inert anode, such as lead, the voltage necessary was increased to 3.0 volts.

EXAMPLE 5

An electrolytic cell corresponding to FIG. 1 is constructed with a hydrogen ion-producing anode and a cathode consisting of a mold of a piece to be electroformed. The electrolyte consists of $NiSO_4$, 240 grams per liter, and sulfuric acid, 75 grams per liter. A current density of 40 milliamps. per square cm. is maintained at the mold cathode at 1.1 volts. Hydrogen gas is introduced into the anode. A conventional electroforming cell operating at this current density requires a voltage of 2.8 volts, thus illustrating the power savings of this invention.

In place of the nickel sulfate-sulfuric acid electrolyte, nickle acetate-acetic acid electrolyte was used. Similar results were obtained without oxidation of acetic acid or acetate. In this case, methanol was fed as the fuel through the porous electrode.

EXAMPLE 6

A cell of the design of FIG. 1 is constructed with a hydrogen anode, an iron cathode to be electrogalvanized, and an electrolyte solution of zinc sulfate containing 120 grams of Zn per liter (specific gravity 1.3). The current density is 30 milliamps. per square cm. and the voltage across the cell is 2.1 volts. Ninety percent pure hydrogen is passed into the anode at an adequate rate. In addition to zinc deposit at the cathode, some hydrogen gas is liberated at the cathode which is collected and recirculated to the anode to supply part of the fuel. In the absence of the fuel anode, 4.4 volts is required to maintain the current density, thus demonstrating the savings accomplished by the process of this invention.

EXAMPLE 7

One important application of this invention is the regeneration of pickle liquor for steel. In general, pickle liquor consists of a mixture of sulfuric acid and ferrous sulfate in acqueous solution. A typical pickle liquor containing sulfuric acid and ferrous sulfate in concentration of 3 normal each is evaporated to result in a slurry of ferrous sulfate crystals and sulfuric acid. The crystals are separated from the motor liquor. The concentrated sulfuric acid mother liquor (containing some residual iron) is directly reused and the ferrous sulfate crystals (with some sulfuric acid retained) are redissolved in water producing a saturated solution at 90° C. The ferrous sulfate solution is fed to a cell constructed in accordance with FIG. 2. The ferrous sulfate solution is fed to the cathode compartment first, from there it is forced through the porous diaphragm (asbestos), into the anode compartment and from there out of the cell. In a first series of experiments, a mixture of carbon monoxide and hydrogen gas was used to supply the fuel to the fuel anode. In this operation, a current density of 40 milliamps. per square cm. was used, the temperature was 90° C., and the voltage required was approximately 1.25 volts. The cathode in these experiments was an iron grid.

EXAMPLE 7(a)

Alternately, the pickle liquor, 3 normal in sulfuric acid and 3 normal in ferrous sulfate, was fed directly to the cathode compartment of the same cell. In this case, a current density of 25 milliamps. per square cm. was used at about 75° C. The voltage required was about 1.7. In addition to plating iron on the cathode, some hydrogen gas was evolved because of the relatively high acid concentration fed to the catholyte. This hydrogen gas was combined with the mixture of carbon monoxide and hydrogen fed to the fuel anode and thereby reutilized.

EXAMPLE 7(b)

A typical "wire mill" pickle liquor was then regenerated. The wire mill pickle liquor had a composition of about 4% $H_2SO_4$ and about 21% $FeSO_4$. This liquor was fed to the two-compartment cell of FIG. 2 as above for the ferrous sulfate solution. In this case, where substantially no hydrogen is evolved at the cathode, carbon monoxide was used as the fuel at the anode and was converted at the anode from CO to $CO_2$. The $CO_2$ was then passed over a hot bed of coal, approximately 1000° C., thereby converting it back to carbon monoxide in accordance with the reaction: $CO_2+C\rightarrow 2CO$. The carbon monoxide was then fed back into the cell as the fuel for the fuel anode. Thus, iron is plated out at the cathode and sulfuric acid is regenerated in the anode solution. In this process, about one-third of the iron fed to the cathode cell was plated out and replaced with hydrogen ion per pass. The regenerated liquor containing ⅔ of the initial iron and ⅓ of the acid was directly reused for wire pickling. The regeneration was carried out at a temperature of 80° C., with a current density of about 60 milliamps. per square cm. at a voltage of about 2 volts.

EXAMPLE 7(c)

Lignin sulfonic acid is a very good solvent for iron oxide and can be used in pickling steel. A particularly economical source of lignin sulfonic acid is obtained from paper wastes. A solution containing 1 normal ferrous lignosulfonate and being .5 normal in free lignin sulfonic acid and containing also small amounts of sulfurous acid was used in place of the pickle liquor described above. Similar results were obtained without oxidation of lignin sulfonic acid.

I claim:

1. The method of regenerating spent pickle liquor comprising passing a spent pickle liquor comprising a mixture of sulfuric acid and ferrous sulfate into the cathode compartment of a two-compartment cell defined by a porous diaphragm, said cell having a solid nonporous cathode in one compartment and a porous catalytic anode in the other compartment, said pickle liquor being under sufficient pressure to pass through said porous diaphragm into the anode compartment, introducing a hydrogen ion producing fuel through said catalytic anode, said catalyst of the anode comprising a material capable of effecting hydrogen ion producing electrochemical reaction at the interface between said fuel and said pickle liquor to form hydrogen ions, passing a direct current from the anode to the cathode of said cell to cause the deposition of said iron metal at said cathode, and removing regenerated sulfuric acid pickle liquor from the anode compartment.

2. The method of claim 1, wherein the catalyst is selected from the group consisting of platinum, rhodium and palladium.

3. The method of claim 1, wherein the said hydrogen ion producing fuel is selected from the group consisting of hydrogen, hydrocarbons, methanol, carbon monoxide, reformed natural gas, partially oxidized natural gas, and water gas.

4. The method of electrowinning of a metal selected from the group consisting of Cu, Fe, Zn, Cr, Ni, Mn, Co, and Cd from their aqueous electrolyte solutions selected from the group consisting of sulfates, nitrates, halides, carboxylates, acetates and sulfonates, comprising: passing said eletcrolyte into the cathode compartment of a two-compartment cell defined by a porous diaphragm, said cell having a solid non-porous cathode in one compartment and a porous catalytic anode in the other compartment, said electrolyte solution being under sufficient pressure to pass through said porous diaphragm into the anode compartment, introducing a hydrogen ion producing fuel through said catalytic porous anode, said catalyst of the anode comprising a material capable of effecting hydrogen ion producing electrochemical reaction at the interface between said fuel and said electrolyte solution to form hydrogen ions, passing a direct current from the anode to the cathode of said cell to cause the deposition of said metal at said cathode, and removing the reacted electrolyte from the anode compartment.

References Cited in the file of this patent

UNITED STATES PATENTS

| | | |
|---|---|---|
| 2,273,797 | Heise et al | Feb. 17, 1942 |
| 2,273,798 | Heise et al. | Feb. 17, 1942 |
| 2,384,463 | Gunn et al. | Sept. 11, 1945 |
| 2,389,691 | Schumacher et al. | Nov. 27, 1945 |
| 2,583,098 | Heise et al. | Jan. 22, 1952 |

FOREIGN PATENTS

| | | |
|---|---|---|
| 303,027 | Great Britain | Oct. 24, 1929 |
| 400,787 | France | Aug. 7, 1909 |

OTHER REFERENCES

Glasstone et al.: "Electrolytic Oxidation and Reduction," 1936, page 36.

Transactions of The Electrochemical Society, volume 75, 1939, pages 147–166.